US009330079B1

(12) United States Patent
Marcks et al.

(10) Patent No.: US 9,330,079 B1
(45) Date of Patent: May 3, 2016

(54) SYSTEMS AND METHODS FOR BLOCKING DATA MANAGEMENT FOR DISTRIBUTED CONTENT DELIVERY FOR INTERACTIVE DOCUMENTS

(75) Inventors: David Marcks, Seattle, WA (US); Matthew Trahan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 763 days.

(21) Appl. No.: 13/461,547

(22) Filed: May 1, 2012

(51) Int. Cl.
*G06F 17/24* (2006.01)
*G06F 17/22* (2006.01)

(52) U.S. Cl.
CPC .................................... *G06F 17/24* (2013.01)

(58) Field of Classification Search
CPC .... G06F 17/3089; G06F 9/54; H04L 43/0852
USPC ................................................. 715/200, 201
See application file for complete search history.

(56) References Cited

U.S. PATENT DOCUMENTS

| | | | | |
|---|---|---|---|---|
| 6,701,350 B1* | 3/2004 | Mitchell | ........... | G06F 17/30884 705/14.73 |
| 6,983,331 B1* | 1/2006 | Mitchell | ........... | G06F 17/30905 707/E17.121 |
| 7,376,653 B2* | 5/2008 | Hart, III | ................... | H04L 67/06 707/957 |
| 7,437,660 B1* | 10/2008 | Mehta | ............... | G06F 17/30893 709/203 |
| 7,712,016 B2* | 5/2010 | Jones | ...................... | G06F 17/24 715/200 |
| 8,578,283 B2* | 11/2013 | Whytock | ............... | G06F 9/4443 715/764 |
| 8,582,872 B1* | 11/2013 | Ioffe | ................. | G06F 17/30247 382/159 |
| 8,667,417 B1* | 3/2014 | Goodger | ........... | G06F 17/30899 715/808 |
| 8,751,925 B1* | 6/2014 | Zhang | ................... | G06F 17/227 715/234 |
| 8,938,689 B2* | 1/2015 | Kilgore | ................. | G06F 9/4443 708/165 |
| 2002/0032701 A1* | 3/2002 | Gao | ................ | G06F 17/30902 715/240 |
| 2002/0156815 A1* | 10/2002 | Davia | .................. | G06F 17/3089 715/243 |
| 2004/0168122 A1* | 8/2004 | Kobipalayam Murugaiyan | ....... | G06F 17/3089 715/234 |
| 2005/0160065 A1* | 7/2005 | Seeman | ............ | G06F 17/30867 |
| 2006/0041637 A1* | 2/2006 | Jerrard-Dunne | ........ | H04L 67/28 709/219 |
| 2007/0271389 A1* | 11/2007 | Joshi | ................... | G06F 17/3089 709/231 |
| 2007/0288864 A1* | 12/2007 | Keereepart | ........ | G06F 17/30696 715/790 |
| 2007/0294627 A1* | 12/2007 | Sauve | .................. | G06F 9/4443 715/760 |
| 2008/0133722 A1* | 6/2008 | Ramasundaram | ...... | H04L 67/02 709/222 |
| 2010/0057864 A1* | 3/2010 | Laird-McConnell | | G06Q 10/107 709/206 |
| 2011/0022984 A1* | 1/2011 | van der Meulen | .. | G06F 9/44526 715/830 |
| 2011/0189714 A1* | 8/2011 | Ayliffe | ................... | C12M 47/04 435/29 |
| 2012/0185463 A1* | 7/2012 | Lim | .................. | G06F 17/30256 707/722 |
| 2012/0192080 A1* | 7/2012 | Lloyd | ............... | G06F 17/30905 715/744 |
| 2012/0284738 A1* | 11/2012 | Narasimhan | ........... | H04H 20/38 725/16 |

* cited by examiner

*Primary Examiner* — Scott Baderman
*Assistant Examiner* — Mario M Velez-Lopez
(74) *Attorney, Agent, or Firm* — Sutherland Asbill & Brennan LLP (57) ABSTRACT

Systems and methods for prioritizing content generation in a distributed content system are described herein. In one aspect, content parameters are defined and prioritized according to various characteristics of the content. Type and subject matter of the content may influence content parameter definition and prioritization. Additionally, the position and size of the content within an interactive display may impact the priority assigned to the content parameters. As the content parameters are processed, an analysis tool may determine blocking data which inhibits or delays presentation or processing. Accordingly, the system may request the blocking data from other devices in the system in order to continue generating content.

31 Claims, 8 Drawing Sheets

SYSTEMS AND METHODS FOR BLOCKING DATA MANAGEMENT FOR DISTRIBUTED CONTENT DELIVERY FOR INTERACTIVE DOCUMENTS

BACKGROUND

Online merchants have grown to offer a wide variety of goods and services on a global scale. The effective and timely distribution of online content enhances the customer experience. As online merchants attempt to meet greater demand from customers, the burden of managing online transactions has also increased. Due to the increased volume of user traffic, online merchants have turned to distributed content systems to provide multifaceted content displays. However, the complexity of distributed content systems provides new challenges to delivering content in a timely manner.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout. Hence, if a feature is used across several drawings, the number used to identify the feature in the drawing where the feature first appeared will be used in later drawings.

DETAILED DESCRIPTION

Online merchants offer a wide variety of products and services to online consumers. Providing content information that is timely and engaging benefits the users and merchants. Content information is timely when it is received within a predetermined amount of time. For example, communication may be timely when the communication arrives within one second of the predetermined amount of time, and is untimely if the communication arrives more than one second after the predetermined time.

Described herein are systems and methods for generating content for an interactive document using a distributed content system. The interactive document may be viewed by user devices executing Internet browsers, dedicated applications, and so forth. The content may be generated using a combination of servers that define content parameters to generate content, generate the content, and then collate the content for display in the interactive document.

The distributed content system may include a user device presenting an interactive document, a portal server to define and prioritize content parameters in response to a request from the user device via the interactive document, and a plurality of portlet servers that use the content parameters to generate content. The portal server may collate the content from the portlet servers and incorporate the content into the interactive document displayed by the browser.

Content parameters are defined and prioritized according to various characteristics of the content. The type and subject matter of the content may influence content parameter definition and prioritization. The content type may include but is not limited to: text, images, audio, video, or combinations thereof. The subject matter may be, but is not limited to: promotional displays, product displays, administrative displays, or any other subject type that may be displayed on the interactive document for any purpose. Additionally, the position and size of the content within the interactive display may impact the priority given to the content parameters.

A call and response method may be utilized between the portal server and the portlet servers to manage content generation. For example, the content parameters may be distributed between several portlet servers to generate separate content pieces for the interactive documents. A portlet server may identify blocking data that inhibits content generation. Blocking data may comprise any data that prevents or inhibits content generation. In some instances, the blocking data may pertain to content parameters that are unavailable to the portlet server either due to omission or latency issues. Hence, content generation is delayed which may render content delivery untimely to the user. The portlet server may request the blocking data from a source for the blocking data (e.g., portal server). The blocking data request may also include a ranking that indicates an order for sending the blocking data. The ranking may be based on content type, content latency, content subject matter, and/or content arrangement.

Accordingly, the content distribution system may iteratively manage the call and response system and method described above to send content parameters to a variety of content generators and then collate the content into an interactive document. Timely response of content to the user may thus be provided.

Illustrative System

Figure 1:
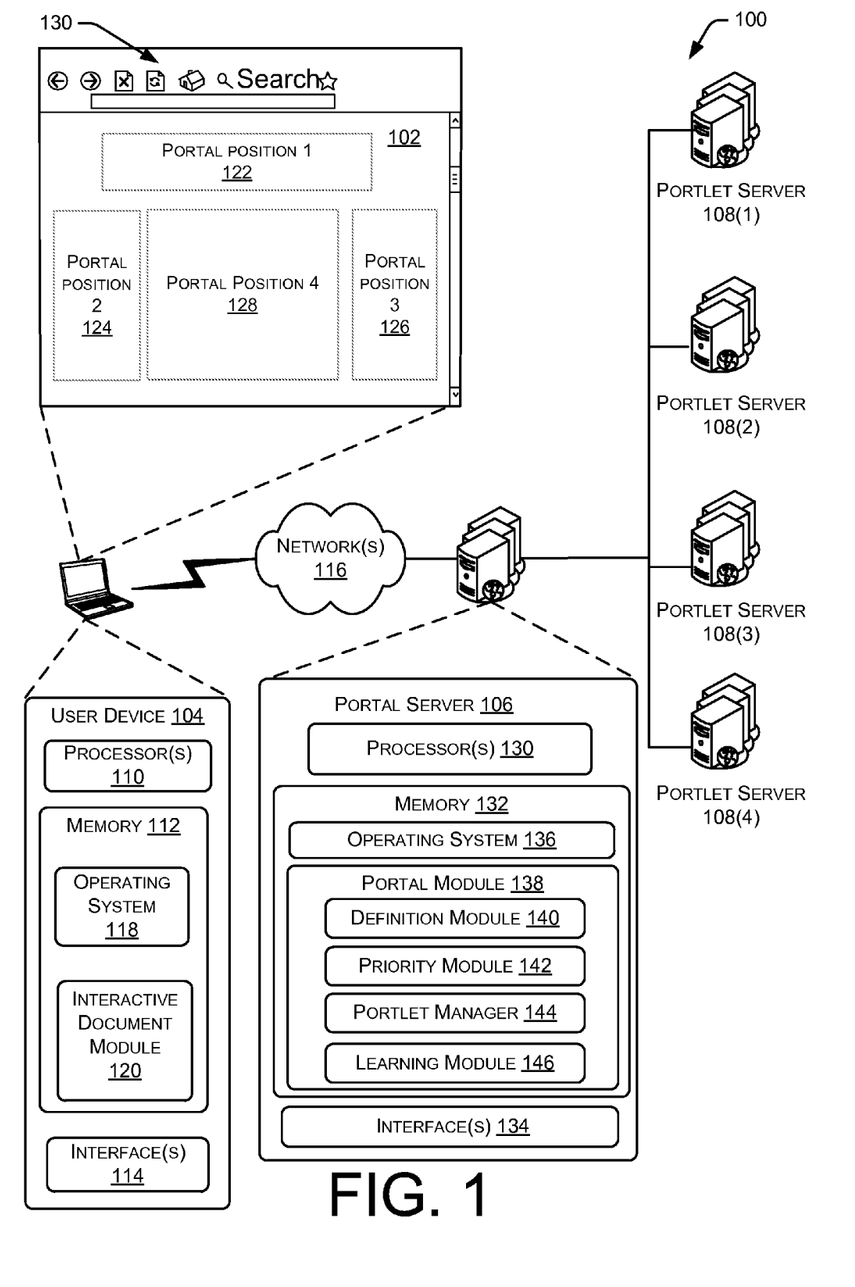
FIG. 1 illustrates a system for generating and presenting content in accordance with an embodiment of the disclosure.

FIG. 1 illustrates a system 100 for generating content for an interactive document 102. The system 100 may include a user device 104, a portal server 106, and a plurality of portlet servers 108(1), 108(2), 108(3), and 108(4). While a single user device 104, a single portal server 106, and four portlet servers 108 are shown, it is understood that any number of these devices may be present in the system 100.

The user device 104 may include smartphones, laptops, desktops, tablet computers, televisions, set-top boxes, game consoles, in-vehicle computer systems, and so forth. The user devices 104 may comprise one or more processors 110, one or more memories 112, and one or more interfaces 114. These interfaces 114 allow for coupling devices such as keyboards, joysticks, touch sensors, cameras, microphones, speakers, haptic output devices, memories, and so forth to the user device 104. The haptic output device may comprise one or more actuators, signal generators, and so forth. For example, the haptic output device may generate direct electrical stimulation of nerves of the user, actuate a piezoelectric element, actuate a motor, and so forth.

The interfaces 114 may also comprise one or more communication interfaces or network interface devices to provide for the transfer of data between the user device 104 and another device directly such as in a peer-to-peer fashion, via a network 116, or both. The communication interfaces may include, but are not limited to: personal area networks ("PANs"), wired local area networks ("LANs"), wireless local area networks ("WLANs"), wireless wide area networks ("WWANs"), and so forth. The communication interfaces may utilize acoustic, radio frequency, optical or other signals to exchange data between the user device 104 and another device such as an access point, a host computer, a server, a router, a reader device, another user device 104, and the like. The network 116 may include, but is not limited to, the Internet, a private network, a virtual private network, a wireless wide area network, a local area network, a metropolitan area network, a telephone network, and so forth.

The processors 110 may comprise one or more cores and are configured to access and execute (at least in part) instructions stored in the one or more memories 112. The one or more memories 112 comprise one or more computer-readable storage media ("CRSM"). In some embodiments, the one or more memories 112 may include non-transitory media such as random access memory ("RAM"), flash RAM, magnetic media, optical media, solid state media, and so forth. The one or more memories 112 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 112 may store an operating system 118 that includes a plurality of computer-executable instructions that may be implemented by the processor 110 to perform a variety of tasks to operate the interface(s) 114 and any other hardware installed on the user device 104. The memory 112 may also store an interactive document module 120 configured to manage the content provided from the portal server 106 that is displayed on a display of the user device 104 using the interactive document 102. The interactive document module 120 may comprise an Internet Browser, a stand-alone application, or a client application.

The interactive document module 120 may be configured to present one or more content modules 122, 124, 126, and 128 and a task bar 130. The task bar 130 enables a user to interface with the interactive document 102 using a search bar, a forward button, a back button, a home button, a reload, and a stop loading button. The content modules (e.g., content module 122) may display a variety of content generated by the portlet servers 108. The content module 122 may display content independent of the other content modules. In one embodiment, each content module 122, 124, 126, and 128 may have content generated by its own portlet server 108. However, in an alternative embodiment, a portlet server 108 may generate content for more than one content module 122, 124, 126, and 128.

The portal server 106 may provide access to an online merchant or service provider for the user device 104 via a wireless or wired connection to the network 116. At a high level, the portal server 106 may direct content to the content modules 122, 124, 126, and 128 residing on the interactive document 102. The content may be generated by the portal server 106, the portlet servers 108, and/or a combination thereof. The portal server 106 may be deployed in a stand-alone server such as depicted here, distributed across multiple servers, provided as a cloud service, or reside as an application on the user device 104. The portal server 106 may comprise a variety of hardware, software, and firmware to implement and manage the exchange of content. For example, the portal server 106 may include one or more processors 130, memories 132, and interfaces 134.

The one or more processors 130 may individually comprise one or more cores as described above and are configured to access and execute (at least in part) instructions stored in the one or more memories 132. The one or more memories 132 may comprise one or more CRSMs as described above.

Similar to those described above, the one or more interfaces 134 allow for coupling of devices such as displays, keyboards, storage devices, and so forth to the one or more processors 130 of the portal server 106. Likewise, the one or more interfaces 134 may be configured to couple the portal server 106 to one or more networks 116.

The one or more memories 132 may store instructions for execution by the one or more processors 130 which perform certain actions or functions. These instructions may include an operating system 136 configured to manage hardware resources, such as the interfaces 134, and provide various services to applications executing on the one or more processors 130. The one or more memories 132 may also store lists, arrays, databases, flat files, and so forth. In some implementations, the memories 132 may be stored in memory external to the portal server 106 but accessible via the network 116, such as with a cloud storage service.

The one or more memories 132 may also store a variety of information related to the generation and management of content via the portal server 106. The information may pertain to portal management, content parameter definition for content requests and generation, priority management, and operations learning. A portal module 138 may comprise hardware, software, or a combination thereof to implement a variety of functions related to the aforementioned features. In one aspect, the portal module 138 may receive an interactive document request from the user device 104 that triggers the distributed content system 100 to provide content to the content modules 122, 124, 126, and 128.

In one embodiment, a definition module 140 may receive the interactive document request for content. The definition module 140 defines the requirements to satisfy the interactive document request for information and/or content. Hence, the routing information, content type, arguments or content parameters to define the content may be defined by the definition module 140. The routing information may include the host name, port name, and path name to where the information or content may be sent. The arguments or content parameters will provide instructions on how the content may be generated either at the portal server 106, at one or more of the portlet servers 108, or both.

In conjunction with the definition module 140, a priority module 142 may assign a priority to the content parameters for process sequencing purposes. In this way, the interactive document request may be broken down into segments of content parameters or individual content parameters based upon which content parameters could be processed before or after other content parameters. Accordingly, content parameters may be defined to provide instructions to generate content and prioritized to allow certain types of content to be generated before lower priority content. Priority may be determined based upon requests from the user device and/or by the online merchant/service provider that manages the portal server 106. In one example, the online merchant/service provider may specify priority based upon the type of content, the location or position of the content in the interactive document, and/or the subject matter for the content. However, the priority may be based on any other factor or criteria that may include operational issues dealing with one or more user devices 104 or more than one interactive document request from the same user device 104.

In this embodiment, a portlet manager 144 may route the prioritized content parameter(s) between one or more portlet servers 108. Under the distributed content system, each portlet server 108 may be designated to generate a specific content feature. For example, portlet server 108(1) may generate advertising content, portlet server 108(2) may generate product content, portlet server 108(3) may generate administrative content, and portlet server 108(4) may generate promotional and/or social media content. In this way, the online merchant may streamline processing by designating one or more portlet servers 108 to generate specific types of content. For example, advertising information could be stored in one location and processed in one location, rather than having multiple portlet servers 108 attempting to access the same memory that stores the advertising information. Additionally, if each portlet server 108 stored the advertising information, it may require maintaining and updating multiple advertising databases to maintain consistency and accuracy of the data throughout all of the portlet servers 108. Hence, the portlet manager 144 may route prioritized content parameters to designated portlet servers 108 for processing. Likewise, the priority module 142 may receive a variety of content from the portlet servers 108 that are related to one interactive document request. The priority module 142 may collate the content from the different portlet servers 108 and provide the content on the priority assigned to the content by the priority module 142. However, the portlet manager 144 may also address latency issues related to receiving content out of order due to issues at one of the portlet servers. For example, content may be provided to the user device 104 out of order if higher priority content has not been received. Accordingly, content parameters may be routed away from slow performing portlet servers 108.

In another aspect of this embodiment, the portlet manager 144 may manage multiple requests for the same or similar data from multiple portlet servers 108. The portlet manager 144 may insure consistency of the data being used by the multiple portlet servers 108. For example, the portlet manager 144 may handle requests for user information associated with interactive document 102 or formatting information related to the interactive document 102. The portlet manager 144 may provide responses to the requests to insure that the information being provided to the portlet servers 108 are consistent so user specific content is consistent or content formatting is consistent. For instance, content is more effective in influencing the user when each portion of advertising or formatting is consistently reflected within the provided content. In this way, the content may use the same or similar color scheme, font, background, and/or arrangement even when several pieces of content are being generated by different portlet servers 108. Further, the portlet manager 144 may insure the content is consistent with regard to subject matter, formatting, and organization so that the content subject matter is consistent to present a coherent message to the user or to tie together similarly related pieces of content. For example, the interactive document 102 may include product information related to a product related to a category of products. Accordingly, a coherent message within the interactive document 102 may include advertising content related to the same or similar category or an ad for another item being offered by the company referenced in the product description. Further, user confidence increases when the interactive document 102 presents consistent information related to pricing, quantity, or description.

In this embodiment, the priority module 142 may also receive requests from the portlet servers 108 requesting more content parameters to process due to an empty process queue or to continue processing content parameters based on information that was omitted from the prior transfer of content parameters. For example, the priority module 142 may have merely sent a portion of the content parameters to generate the requested content. In this way, the priority module 142 may manage the flow using smaller discrete portions of content parameters so that the portlet servers 108 are not dominated by a single user device 104. Upon receiving a request from the portlet server 108, the priority module 142 may provide additional content parameters to continue generating content or to generate another piece of content. Hence, a call and response strategy may be implemented and managed by the portlet manager 144 and the portlet servers 108.

In this embodiment, a learning module 146 may utilize the call and response strategy to adapt the determination of content parameter definitions. For example, the portal server 106 may define content parameters to enable the generation of content to satisfy the interactive document request. However, the content parameters provided to the portlet server 108 may be redundant, unutilized, or underutilized during the content generation on the portlet server 108. For instance, the redundant content parameters may provide instructions to the portlet server 108 that were redundant to previously processed content parameters. Alternatively, the content parameters may be unused since they were not required to generate the desired content or that they provided more instructions than were necessary (e.g., underutilized) to generate the content. In short, the amount of content parameters provided to the portlet server 108 were in excess of what was needed to generate the content. Therefore, the learning module 146 may receive a notification from the portlet server 108 indicating that certain content parameters may be excluded during the definition process to satisfy the content requirements of future interactive document requests that may be the same or a similar request that led to an unutilized or underutilized processing condition. Hence, the learning module 146 may adapt or transform the content parameter definition process to prevent inefficient content parameter processing at the portlet servers 108.

Figure 2:
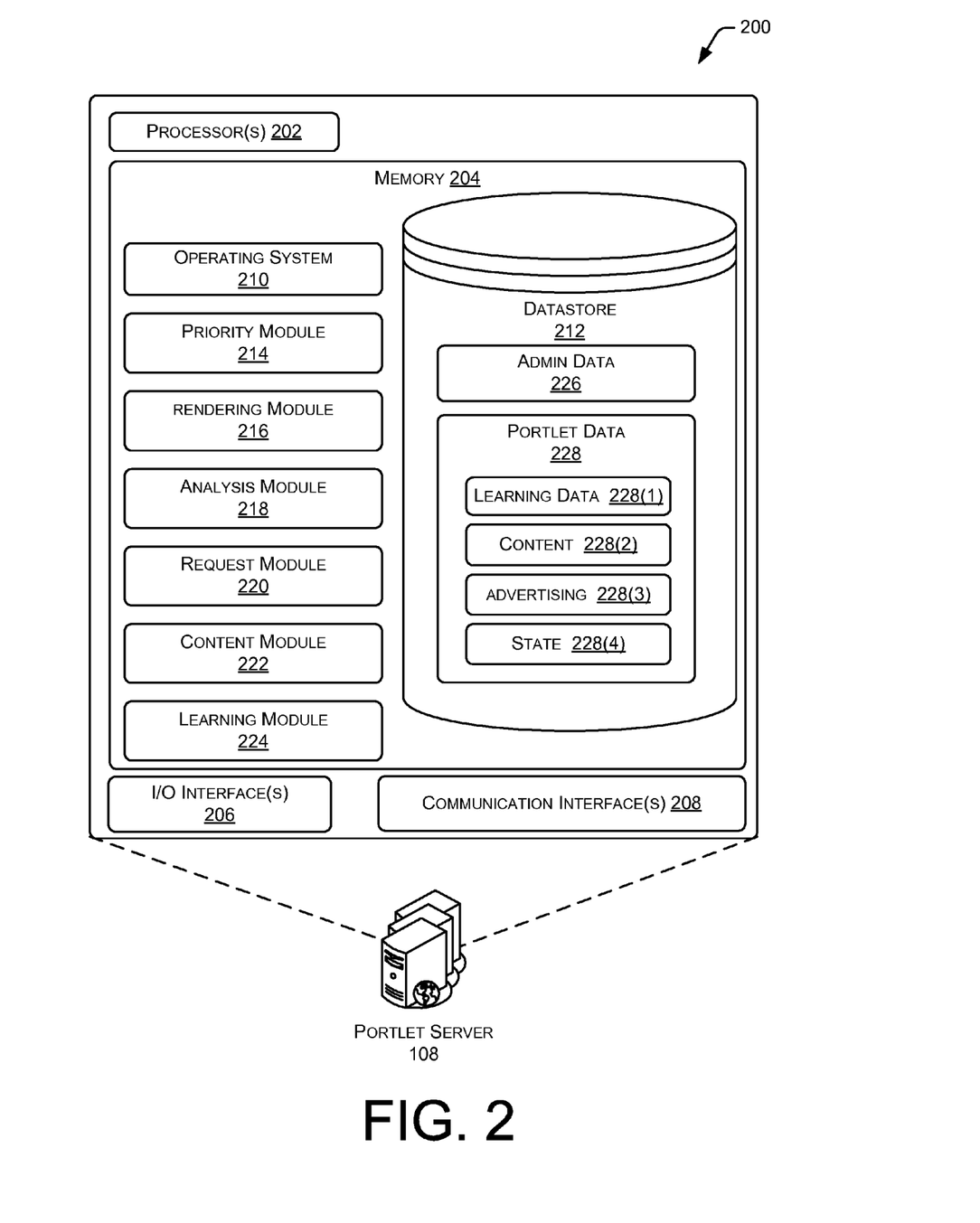
FIG. 2 illustrates a block diagram of a portlet server configured to generate content for interactive documents in accordance with an embodiment of the disclosure.

FIG. 2 illustrates a block diagram 200 of a portlet server 108 configured to generate content for interactive documents 102. As noted above, the portlet server 108 may receive prioritized content parameters from the portal server 106 to generate a variety of content types. The content may comprise advertising, promotional, product, informational, commercial, or any other type of content being requested or available to be displayed or utilized by the user device 104. Broadly, the portlet server 108 may comprise one or more processors 202, one or more memories 204, input/output ("I/O") interfaces 206, communication interface(s) 208, and/or a datastore 212.

The one or more processors 202 may individually comprise one or more cores and are configured to access and execute (at least in part) instructions stored in the one or more memories 204. The one or more memories 204 comprise one or more CRSMs as described above.

Similar to those described above, the one or more I/O interfaces 206 allow for the coupling of devices such as displays, keyboards, storage devices, and so forth to the one or more processors 202 of the portlet server 108. Likewise, the one or more I/O interfaces 206 may be configured to couple the portlet server 108 to one or more networks 116.

The one or more memories 204 may store instructions for execution by the one or more processors 202 which perform certain actions or functions. These instructions may include an operating system 210 configured to manage hardware resources, such as the I/O interfaces 206, and provide various services to applications executing on the one or more processors 202. The one or more memories may also store lists, arrays, databases, flat files, and so forth. In some implementations, the memories 204 may be stored in memory external to the portlet server 108 but accessible via the network 116, such as with a cloud storage service.

The one or more memories 204 may also store a variety of information related to the generation and management of content via the portlet server 108. The information may pertain to content rendering, content prioritizing, request analysis, content management, and/or process learning.

In one embodiment, a priority module 214 may receive prioritized content parameters that may be used to implement instructions to generate content for an interactive document 102. The content parameters may include a priority designation that indicates the possible process sequencing of the content parameters. Alternatively, the priority module 214 may prioritize the content parameters to accommodate the availability of resources from the portlet server 108 or based on any analysis or learning generated by the portlet server 108. Hence, the priority module 214 may validate the priority previously assigned to the content parameters, or the priority module 214 may assign or reassign the priorities.

A rendering module 216 may process the content parameters according to their assigned priority. At a high level, the rendering module 216 will process the content parameters to generate content for the interactive document 102 or a content module 122. Rendering may comprise generating features from model data stored in the memory 204, may pull from a library of rendered features stored in the memory 204, or may modify existing features stored in the memory 204. The content may comprise any form of graphic design related to, but not limited by: text, haptic (e.g., tactile features), image, audio and video features or elements, and any combination thereof.

In one aspect of this embodiment, the completed content may be provided back to the portal server 106. The priority module 214 may also assign a return priority to indicate or establish a priority of content that may be sent back to the portal server 106. Consequently, the portal server 106 may provide a priority indication to the portlet server 108 to manage the priority strategy for returning content.

In another aspect of this embodiment, an analysis module 218 may monitor and analyze the content parameter's processing outcomes and performance. In this way, the portlet server 108 may determine which content parameters are unused, underutilized or missing during content parameter processing. For example, the portlet server 108 may have defined and prioritized a group of content parameters to generate a piece of content. However, the rendering module 216 may not have used or needed all of those content parameters to complete its task. For example, the portlet server 108 provided content parameters A, B, C, and D to generate content. However, the content may be generated using A, C, and D. Hence, the analysis module 218 may note that content parameter B was underutilized. Accordingly, the learning module 146 of the portal server 106 may be notified to prevent defining or prioritizing underutilized content parameters in the future. Alternatively, the portlet server 108 may have omitted a content parameter that could be used to generate content; for example, content parameters A, B, and D were provided, but content parameter C would enable the proper processing of parameters A, B, and D. The analysis module 218 may note this deficiency and notify the learning module 146 of the portal server 106 to prevent future occurrences of this omission.

In another aspect of this embodiment, the omission of content parameter C may be classified as blocking data by the portlet server 108. As noted above, the processing of content parameters A, B, and D may rely on the incorporation of content parameter C into that process. Hence, a latency or delay may be the result of the omission. Another example of blocking data may be the result of a performance issue. For example, the rendering module 216 processes content parameters A, B, C, and D and is ready to process content parameters E and F to complete a content feature. Hence, the analysis module 218, based on prior experience or stored instructions, may determine that content parameters E and F were likely the blocking data.

In this embodiment, a request module 220 may request the blocking data from any source or resource that may comprise the blocking data. The source or resource may comprise the user device 104, the portal server 106, and/or one or more portlet servers 108(1)-(4). The request module 220 may send a specific query to the source or may send a general query throughout the system 100 or to any other network device to locate the blocking data. In general, the requests may also be prioritized either by the request module 220 or the priority module 214. As blocking data is determined or identified, the request module 220 may call to one or more resources to provide the blocking data to limit latency impact and to expedite content generation.

In one aspect of this embodiment, the request module 220 may notify the priority module 214, which may determine to shift processing to another group of content parameters while the blocking data is waiting to be resolved. Accordingly, when the priority module 214 receives notification of the blocking data, the processing priority may be shifted to the content parameters that were awaiting the arrival of the blocking data.

A content module 222 may also be included in this embodiment. Any content subject matter or type determination may be addressed by the content module 222. Hence, the library of content stored in the datastore 212 is indexed and correlated by the content module 222. For example, if advertising information or any other content is generated, the content module 222 stores the content in the datastore 212. Further, if content may be reused over time, the content module 222 can interface with the priority module 214 to determine which content may be pulled from the library without having to regenerate the same content. In one aspect, the content may be time sensitive (or change over time), and the content module 222 would have to flag which features are time dependent or have any other dependency that may result in providing out-of-date or incorrect information. Accordingly, the content module 222 may be able to update the content without having to wholly regenerate the entire content feature; for example, updating available quantities of a product or a timer or counter indicating the expiration of an offer made by an online merchant.

In this embodiment, a learning module 224 may determine and store various patterns related to processing content parameters related to improving the performance of the portlet server 108. For example, the learning module 224 may develop models that predict blocking data conditions or underutilization conditions that may lead to latency delay issues. For example, the learning module 224 may determine that processing a certain content feature may require content parameters A, B, C, D, E, and F. Upon recognition of this pattern, the learning module 224 may instruct the request module 220 to automatically send a request for content parameters D, E, and F when A, B, and C are received at the portlet server 108. Alternatively, the portlet server's learning module 224 may interface with the portal server's learning module 146 to enable the portlet server 108 to always define, prioritize, and send content parameters A, B, C, D, E, and F at the same time. The learning module 224 may develop the patterns over time from monitoring portlet server performance and/or the learning module may receive instructions, rules, or guidelines from other portlet servers 108, the portal servers 106, and/or any other administrative device or system that may desire to improve the performance of the system 100.

In this embodiment, a datastore 212 may store information pertaining to or resulting from the content being generated by the portlet server 108. At a high level, the datastore 212 manages information related to administrative functions and content generation functions. For example, the datastore 212 may include admin data 226 storage and portlet data 228 storage.

The admin data 226 may include information pertaining to the administration of the portlet server 108 within the context of the system 100. For example, the admin data 226 may include network topology information providing visibility of other portlet servers 108(1)-(4) within the system 100. The admin data 226 may also include resource management information allowing the portlet server 108 to manage its hardware and/or software resources to maintain the exchange of information between modules on the server, as well as information exchange with other servers on the system 100.

The portlet data 228 provides information storage to the modules that play a role in generating content for the system 100. Portlet data 228 may include learning data 228(1) storage, content data 228(2) storage, advertising data 228(3) storage, and state data 228(4) storage.

The learning data 228(1) may include information related to determining or identifying blocking data associated with content parameter processing for content generation. As noted above, the blocking data may be information that is unavailable for processing. The data may be unavailable due to omission and/or latency issues within the system 100. The learning data may be provided by the analysis module 218, the request module 220, and the learning module 224 from within the portlet server 108. However, learning data may also be provided from other portlet servers 108(1)-(4) as well as the portal server 106. Any other type of information that may improve portlet server performance may be stored in learning data 228(1) storage.

The content data 228(2) may be used to store content generated by the portlet server 108. For example, for a piece of content that is requested frequently, the content data 228(2) may provide the content without having to generate the content repeatedly. Additionally, the content stored here may also be modified to generate another piece of content.

The advertising data 228(3) may include details related to advertising schemes and/or promotional schemes being implemented by the online merchant or service provider. The data may include features or components that may be included into the content being generated by the portlet server 108. Additional details may include how content may be organized or arranged from multiple pieces of content or how the organization and arrangement may be varied to generate different permutations of the same advertisement or promotional offering to attract a user's attention. For example, an advertisement may be arranged in a different manner when shown to the same user in order to attract his/her attention with different visual, tactile, or audio cues.

The state data 228(4) may include information related to states or conditions present within the portlet server 108 or other portlet servers 108(1)-(4) and/or one or more portal servers 106. The portlet server 108 may use this information to make sure that its systems are in a compatible state within its internal systems and/or other servers and devices in the system 100.

Figure 3:
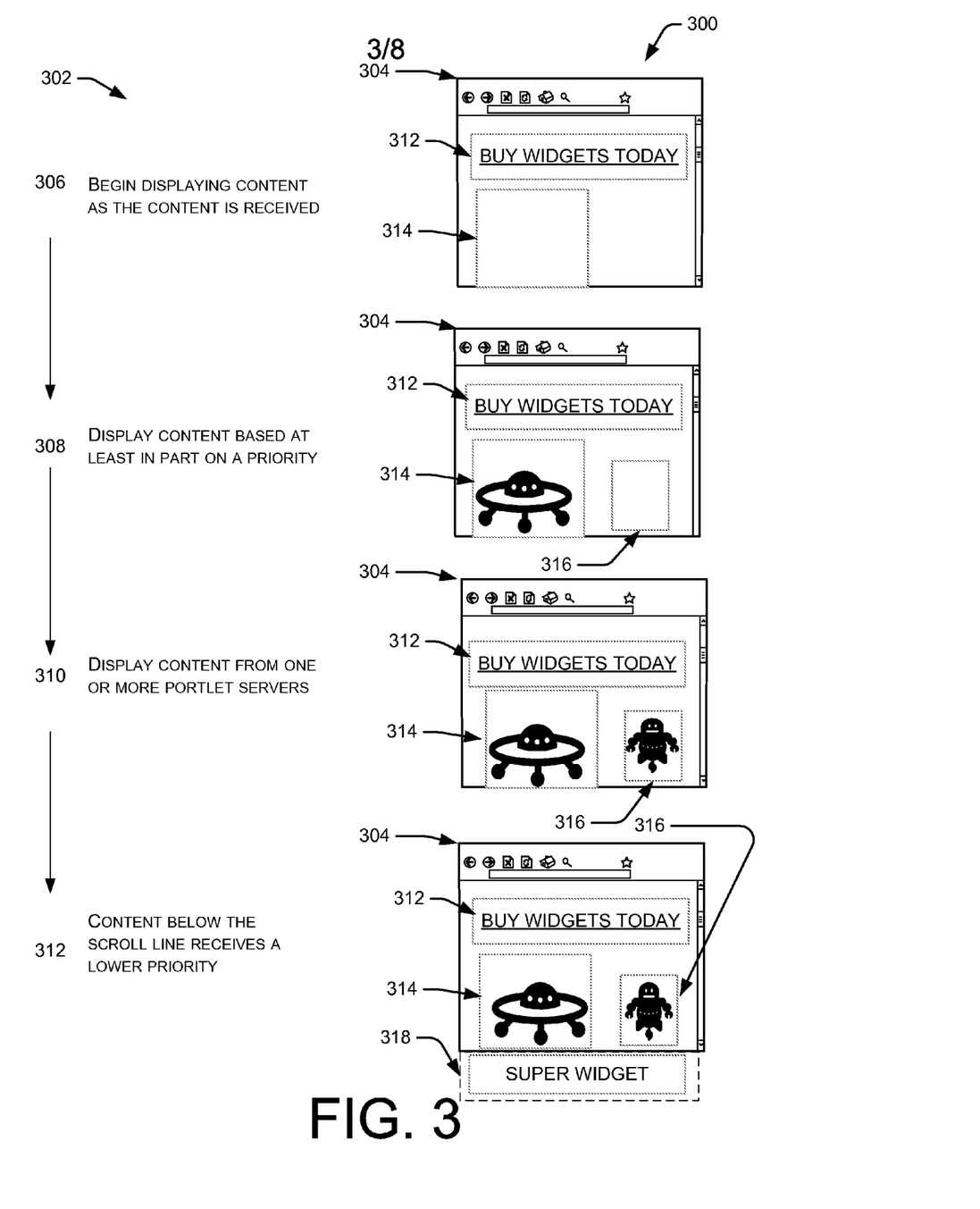
FIG. 3 illustrates a flow diagram and user interface diagrams illustrating the incorporation of content elements into an interactive document in accordance with an embodiment of the disclosure.

FIG. 3 illustrates user interface diagrams 300 and a corresponding flow diagram 302 illustrating the incorporation of content elements into an interactive document 304. The user interface diagrams 300 are viewed in conjunction with the adjacent flow diagram 302.

At block 306, the interactive document 304 receives content from the portal server 106 and begins displaying the content modules 312 and 314 as soon as the content data is received. As shown here, content module 312 has a higher priority than content module 314 because the online merchant wants to show the information in content module 312 before the information in content module 314. In this case, the priority is determined based (at least in part) on the position of content module 312 being at the top of the interactive document 304. In this embodiment, the priority difference is illustrated by the fact that the content module 312 is displayed in its entirety before the content module 314 is displayed. In another embodiment, the priority difference is illustrated by the fact that the content module 312 is displaying the content window with a portion of the advertisement, while the content module 314 is merely showing an empty content window.

At block 308, the priority for displaying content may also be dependent on the type of content being displayed. For example, content module 312 relates to an advertisement for a widget. In one embodiment, the online merchant may desire to prioritize the advertisement over the product being displayed in content module 314. The advertisement may be related to the product displayed in content module 314, and the online merchant may want to draw the user's attention to related items that may also be purchased. In this instance, another content module 316 is also starting to be displayed. The priority for the content module 316 is lower than the other content modules 312 and 314 as evidenced by the lack of content being displayed in the content module 316 window. The priority may be deemed lower based in part on the position and size of the content module 316, which is smaller and in a lower position in relation to the other content modules 312 and 314. Alternatively, the lower priority may also be related to the content type because the content may be related to another ancillary product, a third-party product, and/or an administrative feature (e.g., buy-now or login window).

The priority for displaying may also be limited based in part on whether two or more content modules are receiving content from the same portlet server 108. For instance, when the content modules 314 and 316 are receiving product content from the same portlet server 108, the priority may be based on other factors besides content type, such as location in the interactive document, the size of the content window, and/or the type of content (e.g., text versus video).

At block 310, the interactive document illustration shows that each content module 312, 314, and 316 is displaying content simultaneously, and the content display may also be completed successively. Higher priority content module 314 will be displayed in its entirety before the lower priority content module 316 begins to be displayed. However, in certain instances, lower priority content modules may be displayed before higher priority content modules due to latency issues that impact the higher priority portlet server 108(1) (e.g., advertising portlet server) and not the lower priority portlet server 108(2) (e.g., product portlet server).

At block 312, content module 318 demonstrates that priority may also be based at least in part on whether the content is above or below the scroll line. The scroll line is that portion of the interactive document that may not be seen unless the user scrolls down to view the content. As shown here, the content module 318 may comprise another advertisement for a super widget. Although the online merchant may have designated that advertisement to have a higher priority than product content, the super widget ad is incorporated into the interactive document 304 after the product content modules 314 and 316 since it is below the scroll line and may not be seen by the user until he/she scrolls down in the interactive document 304.

In another aspect, the interactive display may comprise a visible area (e.g., the portion above the scroll line) and a non-visible area (e.g., the portion below the scroll line, content module 318). The scroll line is a threshold for visible content on the display that transitions the non-visible portion to the visible portion as the interactive document is being scrolled. In this example, the visible portion comprises a top portion (e.g., content module 312), a middle portion (e.g., the top portion of content modules 314 and 316), a bottom portion (e.g., the bottom portions of content modules 314 and 316), the top portion being above the middle portion, the middle portion being above the bottom portion.

Figure 4:
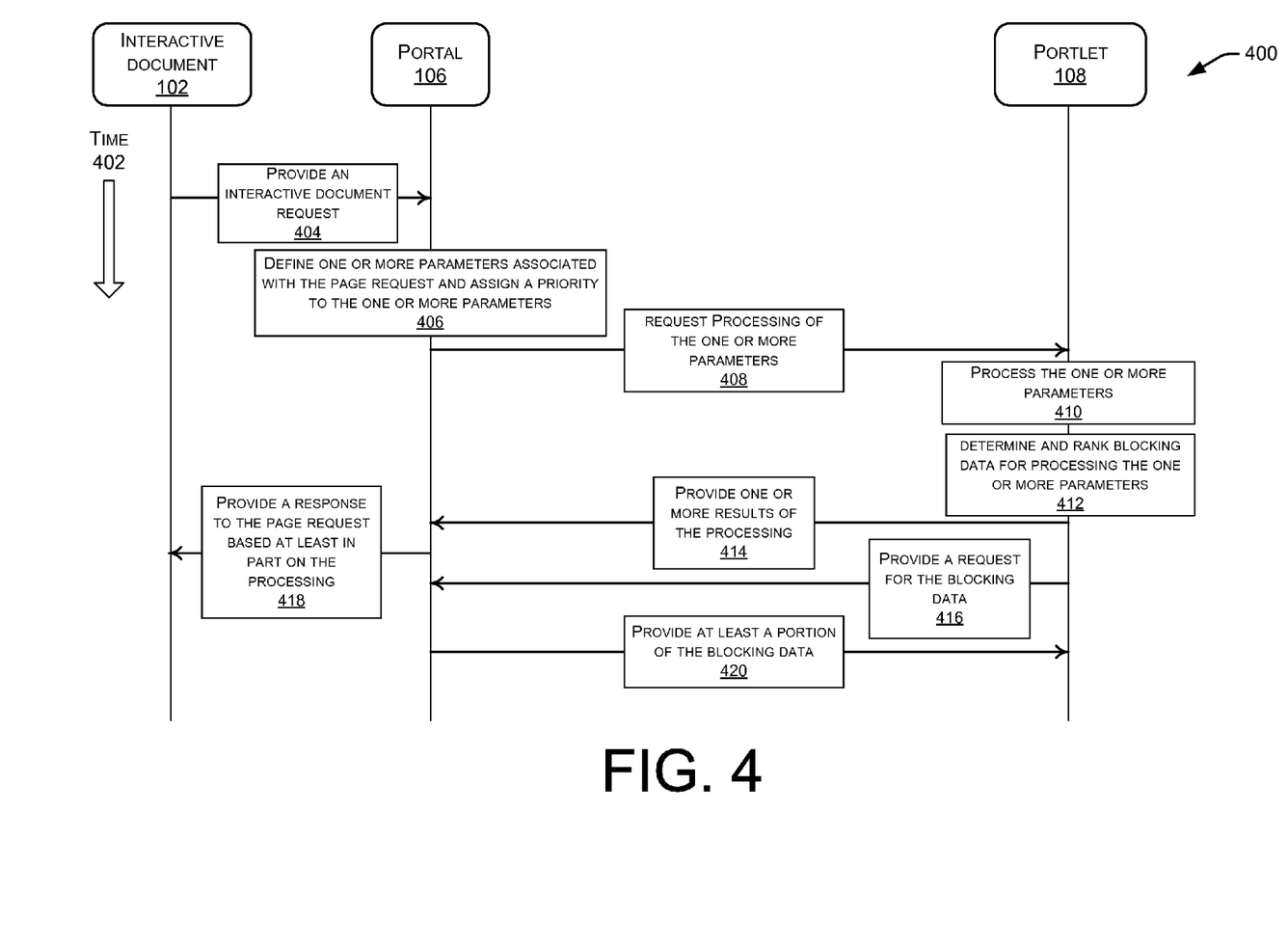
FIG. 4 illustrates a communication flow diagram of several interactions between an interactive document, a portal server, and a portlet server that generates content to be displayed on the interactive document in accordance with an embodiment of the disclosure.

FIG. 4 illustrates a communication flow diagram 400 of several interactions between an interactive document 102, a portal server 106, and a portlet server 108 that generate content to be displayed on the interactive document 102. The flow diagram also includes a time axis 402 that provides an explanation of the potential sequencing of acts between the interactive document 102, the portal server 106, and the portlet server 108. FIG. 4 is a representation of one embodiment for enabling content to be displayed on the interactive document 102. Additional embodiments can include acts performed in a different order, additional acts, or even omitting a portion of the acts illustrated in FIG. 4.

At block 404, the interactive document 102 provides an interactive document request to the portal server 106. The request may be initiated by a user who has selected a link either on the online merchant's website, an advertisement from another webpage, or a link displayed in the search results from a search engine.

At block 406, the portal server 106 defines a plurality of content parameters to satisfy the content demands being requested by the user of the user device 104. The content parameters or arguments provide the instructions or code to generate the content for the interactive document 102. The definition process outlines the requirements to generate the content and may include the type of content (e.g., text, audio, visual), content latency, the subject matter of the content (e.g., product information), the arrangement of the content, or the priority for the content. Content latency may include a delay associated with the content that may be related to the priority of the content or the amount of time or resources to process or transfer the content. Accordingly, the portal server 106 may prioritize the content parameters and may provide groups of higher priority content parameters to the portlet servers 108 in order to expedite content generation. Hence, groups of lower priority content parameters may remain on the portal server 106 while the groups of higher priority content parameters are being processed on the portlet servers 108.

At block 408, the portal server 106 provides the prioritized content parameters to one or more portlet servers 108. In this instance, only one server is shown.

At block 410, the portlet server 108 begins processing the content parameters by validating the priority assigned by the portal server 106. Following priority validation, the content parameters are provided to the rendering module 216 to generate the content. In another embodiment, the priority validation may be omitted.

At block 412, in conjunction with the rendering module 216, the analysis module 218 and/or the learning module 224 may determine if any blocking data is needed to continue processing the content parameters. The blocking data may include any content parameters omitted or withheld by the portal server 106. For example, this would occur if content parameters A, B, C, and D are needed to implement content, and the portlet server 108 only has content parameters A, C, and D. The analysis module 218 may identify that content parameter B is needed to generate a piece of content. Similarly, if content parameters A, B, C, and D have completed processing then the portlet server 108 can continue generating content if the portal server 106 had provided content parameters E, F, and G. Hence, the blocking data would be content parameters E, F, and G.

The analysis module 218 may also rank the blocking data to provide an indication of what blocking data should be provided first, second, or last; for example, if the blocking data is determined to be content parameters E, F, and G, as described above. The analysis module 218 may rank content parameter C at a higher priority than the other content parameters if content parameter C is needed to be processed before the other content parameters. Content parameters E, F, and G may also be ranked individually or as a group. They may be ranked individually if they should be processed in sequential order. Alternatively, if content parameters E and G should be processed together, they may be ranked at a higher priority than content parameter G which may be processed separately since G may not be dependent on other content parameters.

At block 414, as the portlet server 108 completes processing of the content, the content is provided immediately to the portal server 106 for further dissemination. This may include a partial representation of the completed content piece. For instance, the interactive document illustrations in FIG. 3 highlight the partial transfer of content in which portions of the content are displayed as the content is made available from the portlet server 108.

At block 416, the ranked blocking data is provided to a source of the blocking data. In this embodiment, the portal server 106 is the source of the blocking data. However, the source of the blocking data may be other portlet servers 108(1)-(4), the user device 104, or any other server or database that may include information used in the content generation process.

At block 418, the portal server 106 may provide the content to the interactive document 102 when the content is available to be displayed from the one or more content modules 122, 124, 126, and 128.

At block 420, the portal server 106 in this embodiment provides at least a portion of the blocking data back to the portlet server 108. Although not illustrated here, the portlet server 108 may continue processing the blocking data content parameters as if they were the content parameters being processed at block 410. Further, additional blocking data may be determined and ranked, and the process from blocks 414, 416, and 418 may be looped until the content has been generated completely.

Figure 5:
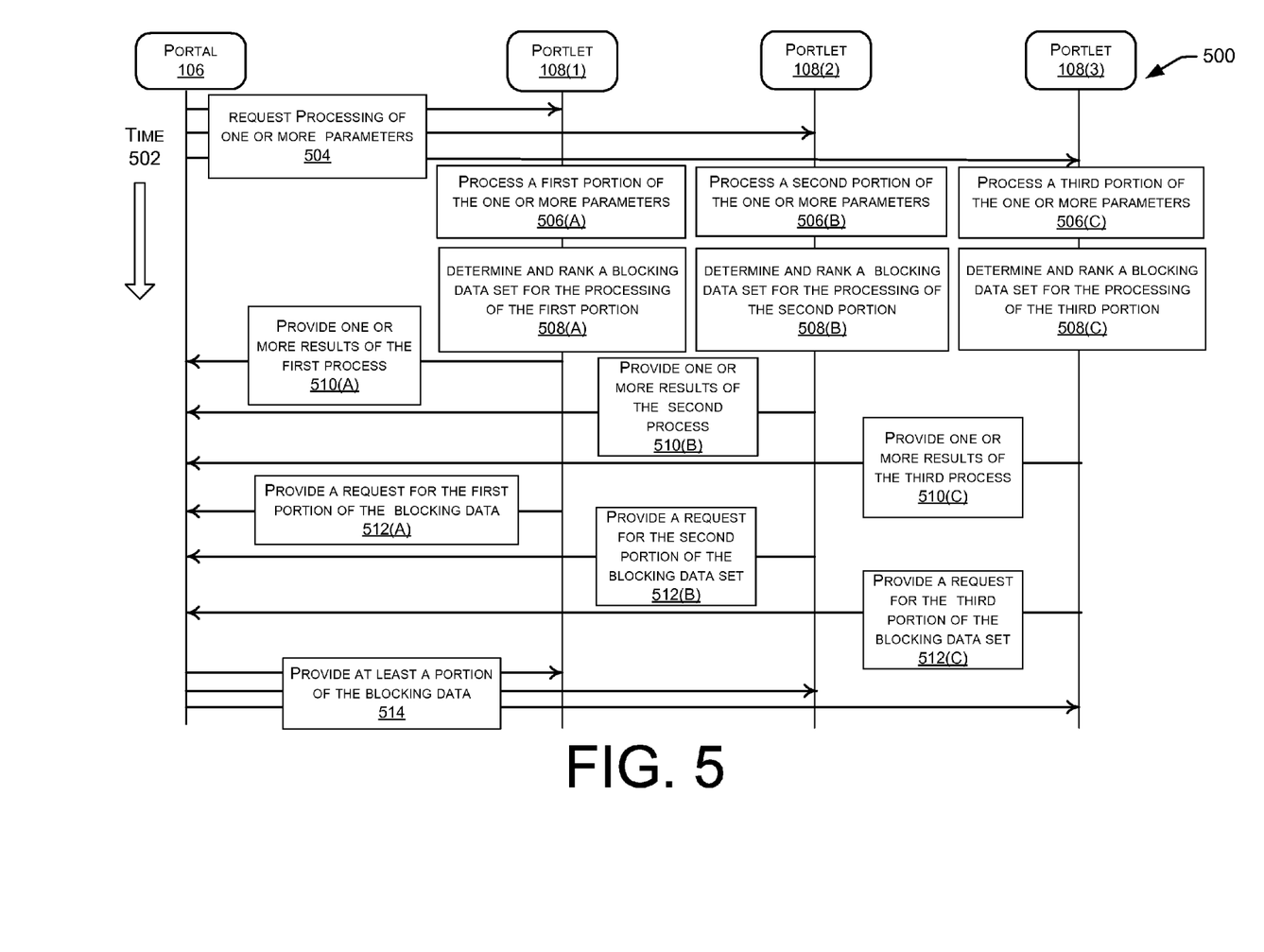
FIG. 5 illustrates a communication flow diagram of several interactions between an interactive document, a portal server, and a plurality of portlet servers generating content to be displayed on the interactive document in accordance with an embodiment of the disclosure.

FIG. 5 illustrates a communication flow diagram 500 of several interactions between an interactive document, a portal server, and a plurality of portlet servers generating content to be displayed on the interactive document (not shown). The flow diagram also includes a time axis 502 that provides an explanation of the potential sequencing of acts between the portal server 106 and the portlet servers 108(1)-108(3). FIG. 5 is a representation of one embodiment for enabling content to be displayed on the interactive document 102. Additional embodiments can include acts performed in a different order, additional acts, or even omitting a portion of the acts illustrated in FIG. 5.

At block 504, the portal server 106 provides groups of content parameters to one or more of the portlet servers 108(1), 108(2), and 108(3). Each of the portlet servers 108 may be responsible for generating different types of content to be displayed on the interactive document 102. For example, portlet server 108(1) may generate content for the advertisements on the interactive document 102. The second portlet server 108(2) may generate content for the product being offered for sale by the online merchant. Lastly, the third portlet server 108(3) may generate content for the administrative features being displayed on the interactive document 102.

As noted above, the content parameters may be prioritized for processing within each portlet server 108. However, they may also be prioritized with respect to the content parameters being sent between the different portlet servers so that the advertising content is sent to the portlet server 108(1) before the content parameters for the product and administrative content are sent to the other portlet servers 108(2) and 108(3).

At blocks 506(A), (B), and (C), each portlet server 108(1), 108(2), and 108(3) will begin processing the content parameters to generate their respective content elements that will be displayed in the interactive document 102. Each portlet server 108 may be responsible for different types of content, such as advertising content (e.g., 108(1)), product offered for sale content (e.g., 108(2)), and administrative content (e.g., 108(3)). This embodiment is an example of the distributed content principle discussed above because content for an interactive document 102 may be generated across more than one portlet server 108(1), 108(2), and 108(3).

At blocks 508(A), (B), and (C), each portlet server 108(1), 108(2), and 108(3) will determine and rank any blocking data that is discovered during the processing of the content parameters. In this instance, each portlet server 108 is performing this determination independently of the other portlet servers 108. The determination and ranking will be done in a similar manner as described above in the single portlet server example, however, with one small difference. The priority content parameter assigned to provide a difference in priority between the portlet servers for the outgoing content parameters in block 512 may be attached to the blocking data being sent back to the portal server 106. In this way, the portal server 106 may be able to disposition the incoming blocking data from multiple sources based on a set priority. For example, setting priorities to distinguish between the portlet servers 108(1), 108(2), and 108(3) allows the portal server 106 to return blocking data to a portlet server 108(1), 108(2), and 108(3) in order of priority.

At blocks 510(A), (B), and (C), each portlet server 108(1), 108(2), and 108(3) returns the portions of the content requested by the portal server 106. As noted above, the portlet servers 108(1), 108(2), and 108(3) may not wait for the entire request to be completed prior to sending their completed portion of the requested content.

At blocks 512(A), (B), and (C), each portlet server 108(1), 108(2), and 108(3) may provide a request for blocking data when, or if, the portlet servers 108(1), 108(2), and 108(3) determine the blocking data exists.

At block 514, the portal server 106 may return at least a portion of the blocking data requested by the portlet servers 108(1), 108(2), and 108(3). Although, not shown here, the content received by the portal server 106 from the portlet servers 108(1), 108(2), and 108(3) is provided to an interactive document 102 to provide content to the content modules 122, 124, 126, and 128. Once the blocking data is provided to the portlet servers 108(1), 108(2), and 108(3), the process between blocks 506-514 may be looped until the content request from the interactive document has been completely fulfilled.

Figure 6:
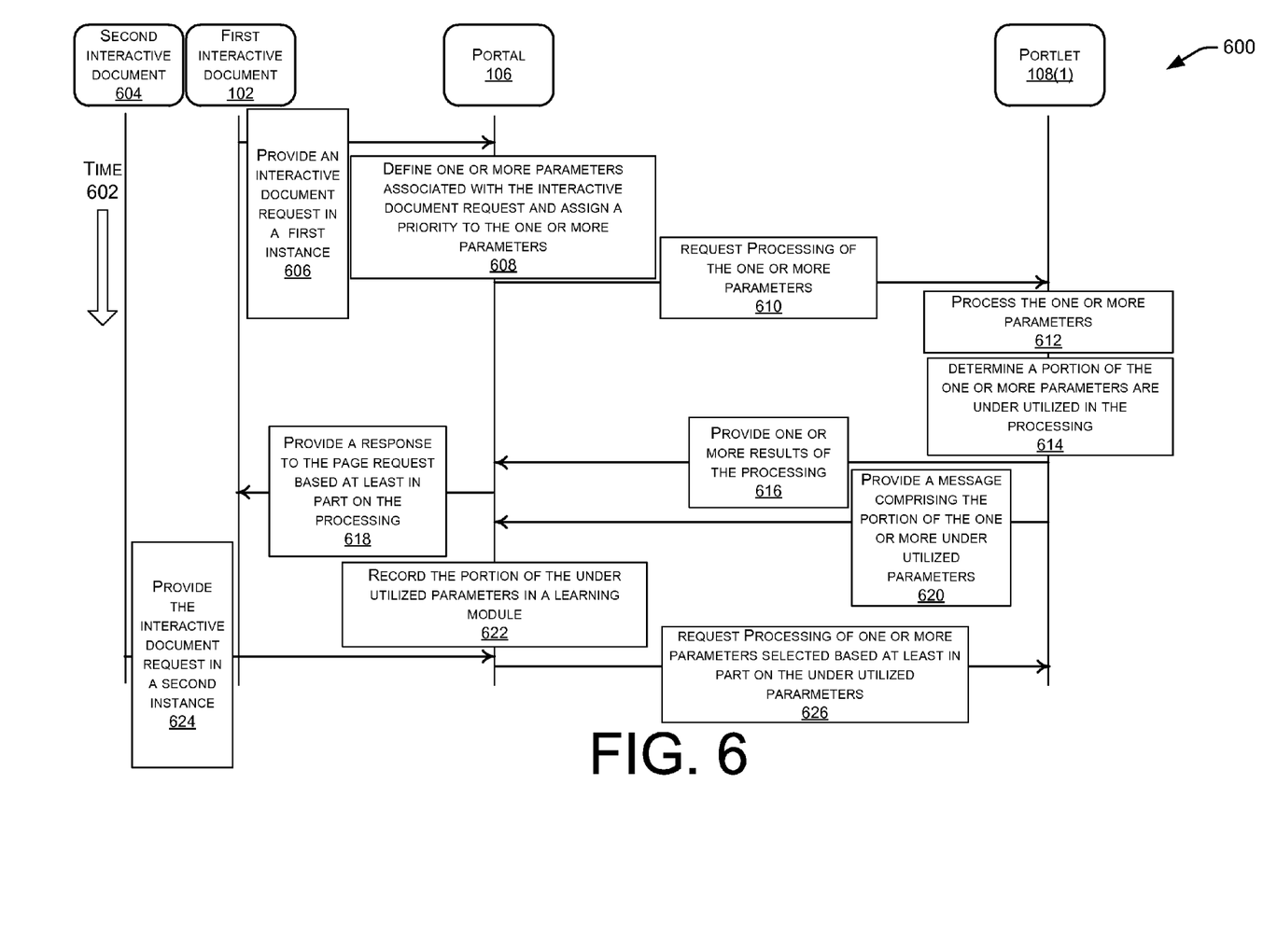
FIG. 6 illustrates a communication flow diagram of several interactions between interactive documents, a portal server, and portlet servers that incorporate efficiencies into the content generation process in accordance with an embodiment of the disclosure.

FIG. 6 illustrates a communication flow diagram 600 of several interactions between interactive documents, a portal server, and portlet servers that incorporate efficiencies into the content generation process. The flow diagram also includes a time axis 602 that provides an explanation of the potential sequencing of acts between the interactive documents, the portal server, and the portlet server. FIG. 6 is a representation of one embodiment for enabling content to be displayed on the interactive document 102. Additional embodiments can include acts performed in a different order, additional acts, or even omitting a portion of the acts illustrated in FIG. 6. In this embodiment, a learning technique to improve content parameter processing is described. For example, the techniques described below will highlight how to update or correct inefficiencies in the content parameter definition process at the portal server 106.

At block 606, the first interactive document 102 provides a content request related to a home page for an online merchant. For example, the request may be initiated by selecting a link on the interactive display that will direct the user device to the home page of the online merchant.

At block 608, the portal server 106 will define and assign a priority to the one or more content parameters needed to generate the requested content at the portlet server 108. As noted above, the definition and priority assignment provide a portion of the instructions to guide the content generation at the portlet server 108.

At block 610, the prioritized content parameters are provided to the portlet server 108 for processing to generate content for one or more content modules 122, 124, 126, and 128 in the interactive document 102.

At block 612, the portlet servers 108 will process the content parameters to generate content for the interactive document 102. This process is similar to the content parameter processing described above in the descriptions of the prior figures.

At block 614, the portlet server 108 may determine that a portion of the content parameters provided by the portal server 106 were underutilized or not used during the content generation process. For example, the portal server 106 may have defined unneeded content parameters to complete the content generation request. In one embodiment, the portlet server 108 may have received content parameters A, B, C, and D to generate a portion of content for the interactive document 102. However, the portlet server 108 may have been able to generate the content with content parameters A, B, and D alone. Hence, content parameter C may be flagged as underutilized by the portlet server 108. In another embodiment, the portlet server 108 may have only had a portion of the content parameter being utilized; for example, if the content parameter C included a real number 5.2568, but the processing only needed an integer value (e.g., 5), or a real number with two significant digits 5.2. Hence, the portal server 106 may send a lower amount of data to accomplish the same task.

At block 616, the content that the portlet server 108 has been able to complete as a result of the content parameter processing is provided to the portal server 106. Again, the content processing does not have to be completed in its entirety in order to begin sending content back to the portal server 106.

At block 618, the portal server 106 provides the completed content to the content module 122 of the interactive document 102.

At block 620, the portlet server 108 may provide a notification of the underutilized content parameters of the content generation process to the learning module 146 of the portal server 106.

At block 622, in this instance, the learning module 146 determines whether the underutilized content parameter was sent in error or whether the algorithms that defined the use of the underutilized content parameter should be updated. In this instance, the definition algorithms were in error, and the learning module 146 updates the content parameter definition algorithms in the definition module 140 accordingly.

At block 624, the portal server 106 may receive a second interactive document request from another interactive document 604. In this instance, the second interactive document 604 request is similar to the first interactive document request 606. Based on the updates to the definition module 140, the portal server 106 defines the second request excluding the content parameters that were deemed underutilized during the content parameter processing for the first interactive document request.

At block 626, the portal server 106 provides a group of content parameters for the second interactive document request that have been defined to exclude at least one of the underutilized content parameters that was sent in response to the first interactive document request.

Figure 7:
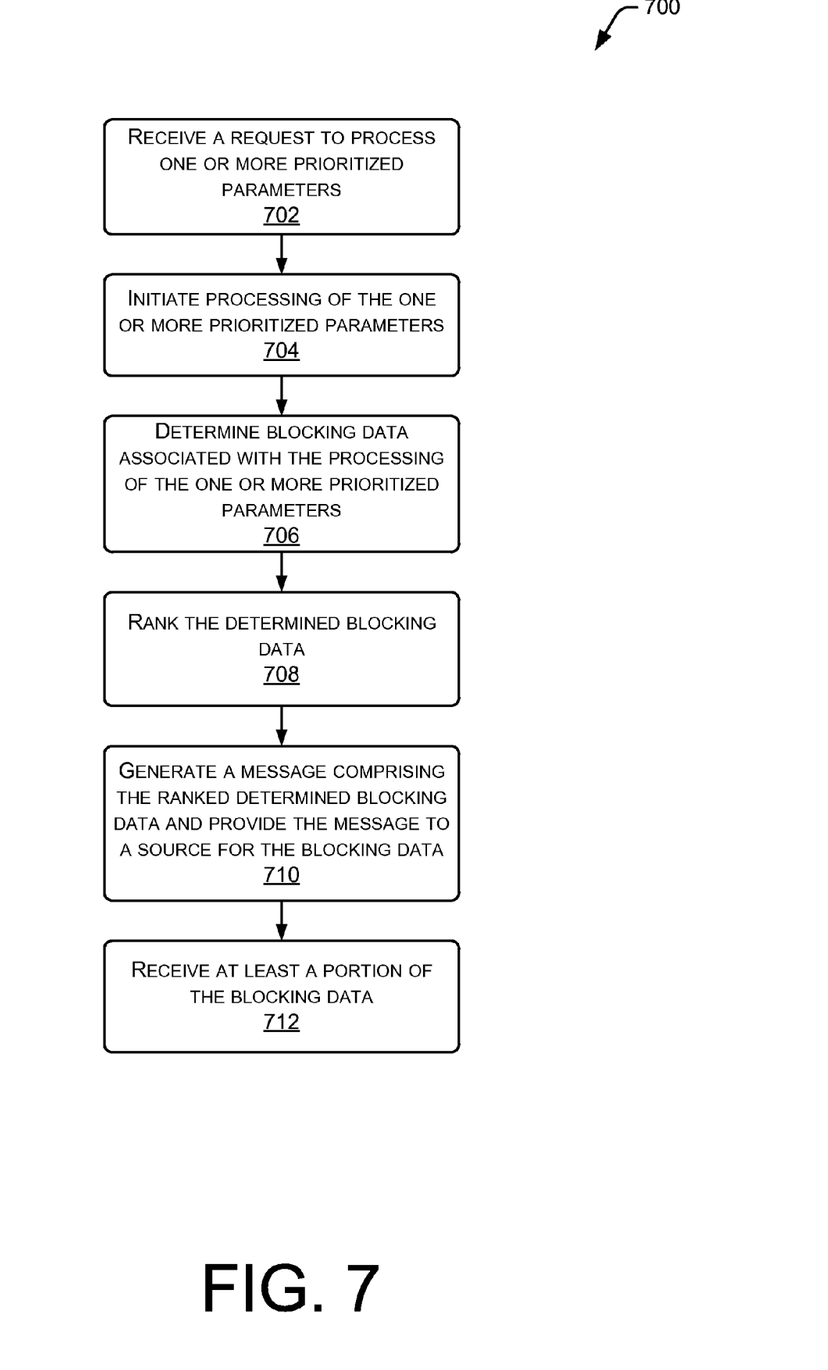
FIG. 7 illustrates a flow diagram of a process of identifying blocking data for the content generation process on the portlet server in accordance with an embodiment of the disclosure.

FIG. 7 illustrates a flow diagram 700 of a process of identifying blocking data for the content generation process on the portlet server 108. As noted above, the portlet server 108 may generate content based at least in part on content parameters provided by the portal server 106. This flow diagram 700 describes an exemplary process from the point of view of the portlet server 108.

At block 702, the portlet server 108 receives a request to process a plurality of content parameters from the portal server 106. The content parameters provide information related to generating content for an interactive document 102.

At block 704, the portlet server 108 begins processing the content parameters to generate at least a portion of the content for the interactive document 102.

At block 706, the portlet server 108 may analyze the role of the content parameters in the generation of the content to determine if blocking data is delaying the content generation process. For example, the portal server 106 may have omitted a content parameter from a group of content parameters that may be used to generate content; for example, if content parameters A, B, and D were provided, but content parameter C would enable the proper processing of A, B, and D. Hence, a latency or delay may be the result of the omission of content parameter C from the group. The analysis module 218 may note this deficiency and notify the learning module 146 of the portal server 106 to prevent future occurrences of this omission.

In another embodiment, blocking data may be the result of a latency issue. For example, the rendering module 216 processes content parameters A, B, C, and D and is ready to process content parameters E and F to complete a content feature. Hence, E and F would be considered blocking data.

In another embodiment, the portal servers 106 may provide content parameters A, B, C, and D to generate content. However, the content may be generated using A, C, and D. Hence, the analysis module 218 may note that content parameter B was underutilized. In this form of blocking data, content parameter B was provided to the portlet server 108 and was unnecessary to the content generation process. Hence, the content generation process may be made more efficient by not including content parameter B in future content requests.

At block 708, the blocking data may be ranked in sequential order based on the criticality of the blocking data. For example, the priority may be based on the size of the content being generated, such as the size of the file associated with the content. Alternatively, the size may be based on the size of the content module 122 on the interactive document 102 for which the content is intended. Blocking data priority may also be based in part on minimizing latency issues in the content generation process. For example, if content parameters X, Y, Z are identified as blocking data and content parameter Y should be processed before content parameter X, then content parameter X will have a lower priority than content parameter Y. Accordingly, process sequence priority of the content parameters is another important ranking criterion. If needed, the ranking priority can be arranged and used in any manner. For example, the blocking data can be ranked using the entire criterion described above, but the portlet server 108 may prioritize the sequencing priority over the size priority to reduce latency issues. Alternatively, in another embodiment, the portlet server 108 may prioritize the content size priority over the sequencing priority.

At block 710, the portlet server 108 may provide the ranked blocking data to the portal server 106 or any other potential source (e.g., user device 104, portlet server 108(1)) of the blocking data. For example, a message may be generated comprising the ranked blocking data and may be sent to the portal server 106 or any other source that may include the blocking data.

At block 712, the portlet server 108 may receive at least a portion of the blocking data from the portal server 106 or any other source that may provide the blocking data.

Figure 8:
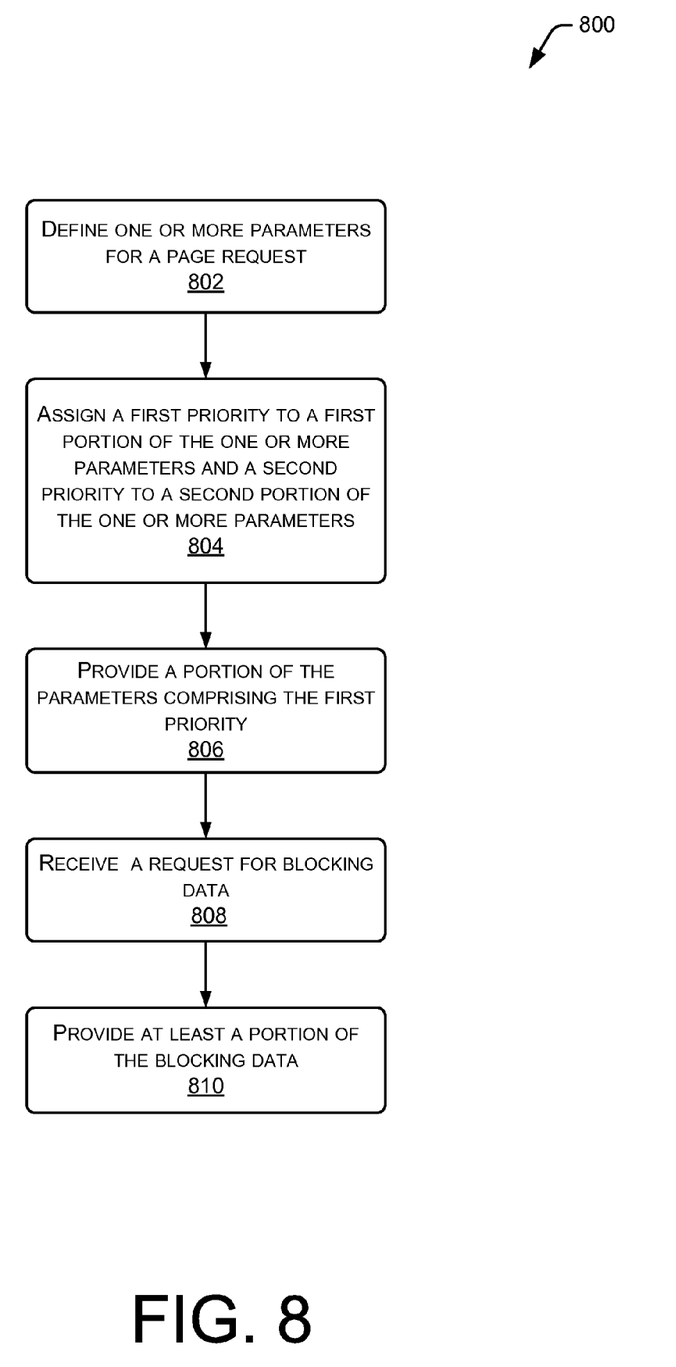
FIG. 8 illustrates a flow diagram of a process of providing content parameter data and blocking data from the portal server to facilitate content generation on the portlet server in accordance with an embodiment of the disclosure.

FIG. 8 illustrates a flow diagram 800 of a process of providing content parameter data and blocking data from the portal server 106 to facilitate content generation on the portlet server 108. Alternatively, the user device 104 may also implement the process of providing content parameter data and blocking data in place of the portal server 106.

At block 802, the portal server 106 may receive an interactive device request from interactive document 102 on the user device 104. Accordingly, the definition module 140 may generate a plurality of content parameters that may be used to generate content to satisfy the interactive document request. The content parameters may provide instructions that direct the portlet server 108 to generate the content.

At block 804, the definition module 140 may assign a first priority to a first group of content parameters and a second priority to a second group of content parameters. As noted above, the priority may be based on the content type, subject matter type, and/or the location of the intended destination within the interactive document. In another embodiment, a third priority may be assigned to a third group of content parameters that may relate to content below the scroll line (e.g., content module 318) or that may not be directly visible to a user when the interactive document 130 is first displayed to the user.

For example, the content parameters related to the top portion of the interactive document may be processed before content parameters associated with content that is located below the scroll line. Additionally, priority may be set based at least in part on the location of the content modules 122, 124, 126, and 128 within the interactive document. For example, the content module 122 located at the top of the interactive document 102 may have the highest priority, the center content module 128 may have the second highest priority, followed by the content modules 124, 126 located to the left and right of the center content module 128.

At block 806, the portal server 106 may provide at least a portion of the first group of content parameters to the portlet server 108. In another embodiment, the portal server 106 may provide the entire first group to the portlet server 108.

At block 808, the portal server 106 receives a request for blocking data. As noted above, blocking data is information that the portlet server 108 may need to continue generating content. The blocking data may reside on the portal server 106, or it may be located on other devices within the system 100. In one embodiment, the blocking data may belong to the first portion of the content parameters with the first priority. Alternatively, the blocking data may belong to the second portion of the content parameters with the second priority. In another embodiment, the blocking data may reside in the user device 104 or another portlet server 108(4).

At block 810, the portal server 106 may provide at least a portion of the blocking data in response to the request received from the portlet server 108. Alternatively, if the blocking data does not reside on the portal server 106, the portal server 106 may search the system 100 to locate the blocking data.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:
1. A device, comprising:
   at least one memory storing computer-executable instructions;
   at least one network interface device; and
   at least one processor configured to access the at least one network interface device and the at least one memory and execute the computer-executable instructions to:

receive, by the device, a request to process content parameters associated with an interactive document, the interactive document comprising one or more content portions received from more than one portlet server, the one or more content portions being collated by a portal server;

initiate, by the device, processing of the content parameters to generate at least one of the content portions of the interactive document;

determine, by the device, that generation of the at least one of the content portions is inhibited by blocking data, the blocking data comprising data that indicates a need for at least one particular content parameter to be present, and if the at least one particular content parameter is not present, the data prevents or inhibits generation of the at least one of the content portions of the interactive document; and in response to determining that generation of the at least one of the content portions is inhibited by the blocking data:

ranking the blocking data; and querying, by the device, a source for the blocking data, wherein the query includes the ranking of the blocking data.

2. The device of claim 1, further executing the computer-executable instructions to:

provide one or more results of the processing of the content parameters at least partly in response to the request to process content parameters associated with the interactive document comprising the one or more content portions; and receive at least a portion of the blocking data to generate the at least one of the content portions.

3. The device of claim 1, wherein the content parameters comprise:

a first portion of the content parameters with a first priority; and a second portion of the content parameters with a second priority, the second priority being lower than the first priority.

4. The device of claim 3, wherein the first priority and the second priority are based at least in part on a content type, content latency, a content subject matter, or a content arrangement, wherein the content type comprises an image or a video; the content latency comprises a delay associated with the content related to priority of the content or processing of the content; the content subject matter comprises promotional content or product content; and the content arrangement comprises a position of the content and a size of a file associated with the content.

5. The device of claim 3, wherein the blocking data comprises information associated with the second priority content parameters.

6. The device of claim 3, wherein the blocking data comprises information associated with the first priority content parameters.

7. The device of claim 1, wherein the content parameters unavailable for processing comprise information that is absent from a process queue for the processing.

8. The device of claim 1, wherein the ranking of the determined blocking data is based at least in part on a sequential processing order to generate the content portion.

9. The device of claim 1, wherein the ranking of the determined blocking data is based at least in part on a content type associated with the blocking data.

10. The device of claim 9, wherein the content type is one or more of the following: text, audio, or video.

11. The device of claim 1, wherein the ranking of the determined blocking data is based at least in part on a size of a portlet window on a display coupled to the at least one processor, the portlet window comprising the content portion, and the size being a surface area of the portlet window as presented on the display.

12. The system of claim 1, wherein the ranking of the blocking data is based at least in part on a size of a file associated with the blocking data.

13. A system comprising:

at least one memory storing computer-executable instructions;

at least one network interface device; and at least one processor configured to access the at least one network interface device and the at least one memory and execute the computer-executable instructions to:

determine content parameters for a content portion of an interactive document based at least in part on receiving an interactive document request;

assign a first priority to a first portion of the content parameters and a second priority to a second portion of the content parameters;

provide at least a portion of the first priority content parameters for processing to a device to generate at least a part of the content portion of the interactive document;

receive, from the device, a request for blocking data associated with the processing of the content portion, wherein the blocking data comprises data that indicates a need for at least one particular content parameter to be present, and if the at least one particular content parameter is not present, the data prevents or inhibits generation of the at least a part of the content portion of the interactive document; and provide at least a portion of the blocking data to the device.

14. The system of claim 13, wherein the content parameters are processed to generate at least a portion of content for the interactive document.

15. The system of claim 13, wherein the content parameters are assigned to one or more regions of the interactive document.

16. The system of claim 15, wherein the first priority and the second priority are based at least in part on a position of the one or more regions in the interactive document.

17. The system of claim 15, wherein:

the interactive document comprises a visible portion above a scroll line, a non-visible portion below the scroll line, the scroll line being a threshold for visible content on the display that transitions the non-visible portion to the visible portion as the interactive document is being scrolled;

the visible portion comprises a top portion, a middle portion, and a bottom portion, the top portion being above the middle portion, the middle portion being above the bottom portion;

the first priority is based at least in part on the first portion of content parameters being associated with one or more regions at the top portion of the interactive document, and the second priority is based at least in part on the second portion of the content parameters being associated with one or more regions at the bottom portion of the interactive document, and a third portion of parameters being assigned a third priority and being associated with the non-visible portion of the interactive document.

18. The system of claim 13, wherein the blocking data comprises an association with the second portion of the one or more content parameters.

19. The system of claim 13, wherein the blocking data comprises an association with the first portion of the one or more content parameters.

20. The system of claim 13, wherein the blocking data comprises information to generate at least a portion of the content for the interactive document.

21. One or more non-transitory computer-readable media storing computer-executable instructions that, when executed by at least one processor, configure the at least one processor to perform operations comprising:
- receiving, by a device, a request to process one or more content parameters to generate a content portion of an interactive document;
- initiating, by the device, processing of the one or more content parameters to generate the content portion;
- determining, by the device, that generation of at least one of the content portions is inhibited by absence of blocking data, the blocking data comprising data that indicates a need for at least one particular content parameter to be present, and if the at least one particular content parameter is not present, the data prevents or inhibits generation of the at least one of the content portions of the interactive document; and
- in response to determining that generation of the at least one of the content is portions is inhibited by the absence of blocking data:
  - ranking the blocking data; and
  - querying, by the device, a source for the blocking data, wherein the query includes the ranking of the blocking data.

22. The computer-readable media of claim 21, further comprising computer-executable instructions that, when executed by the at least one processor, configure the at least one processor to perform operations comprising:
- providing one or more results of the processing of the content parameters at least partly in response to the request to process content parameters associated with the interactive document comprising the one or more content portions; and
- receiving at least a portion of the blocking data to generate the content portion.

23. The computer-readable media of claim 21, wherein the content parameters comprise a first portion of the content parameters with a first priority and a second portion of the content parameters with a second priority, the second priority being lower than the first priority.

24. The computer-readable media of claim 23, wherein the determined blocking data comprises information associated with the first priority content parameters or the second priority content parameters.

25. The computer-readable media of claim 21, wherein the determined blocking data comprises information that is absent from a process queue for the processing to generate the content portion.

26. The computer-readable media of claim 21, wherein the ranking of the determined blocking data is based at least in part on a sequential processing order to generate the content portion or a content type associated with the blocking data.

27. The computer-readable media of claim 21, wherein the ranking of the determined blocking data is based at least in part on a size of a portlet window on a display, the portlet window comprising the intended location of the content portion, and the size comprising a surface area of the portlet window as presented on the display.

28. The computer-readable media of claim 21, wherein the ranking of the determined blocking data is based at least in part on a size of a file associated with the blocking data.

29. One or more non-transitory computer-readable media storing computer-executable instructions that, when executed by at least one processor, configure the at least one processor to perform operations comprising:
- determining one or more content parameters associated with an interactive document request, wherein the one or more content parameters are processed to generate at least a portion of the content for an interactive document;
- assigning a first priority to a first portion of the one or more content parameters and a second priority to a second portion of the one or more content parameters;
- providing at least a portion of the first priority content parameters for processing to a device;
- receiving, from the device, a request for blocking data associated with the processing, wherein the blocking data comprises data that indicates a need for at least one particular content parameter to be present, and if the at least one particular content parameter is not present, the data prevents or inhibits generation of the at least a part of the content portion of the interactive document; and
- providing at least a portion of the blocking data to the device.

30. The computer-readable media of claim 29, wherein the one or more content parameters are assigned to one or more regions of the interactive document, and the first priority and the second priority are based at least in part on a position during presentation of the one or more regions in the interactive document.

31. The computer-readable media of claim 30, wherein the first priority is based at least in part on the first portion of the content parameters being associated with one or more regions at a top portion of the interactive document, and the second priority is based at least in part on the second portion of the content parameters being associated with one or more regions at a bottom portion of the interactive document.

* * * * *